Sept. 26, 1950        F. B. WARD        2,523,978
DISK CUTTING MACHINE
Filed July 19, 1948
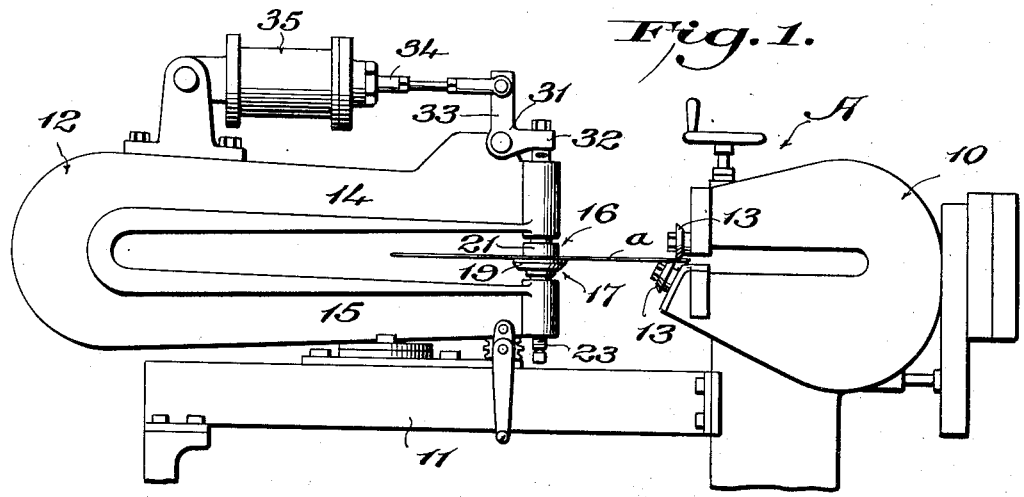
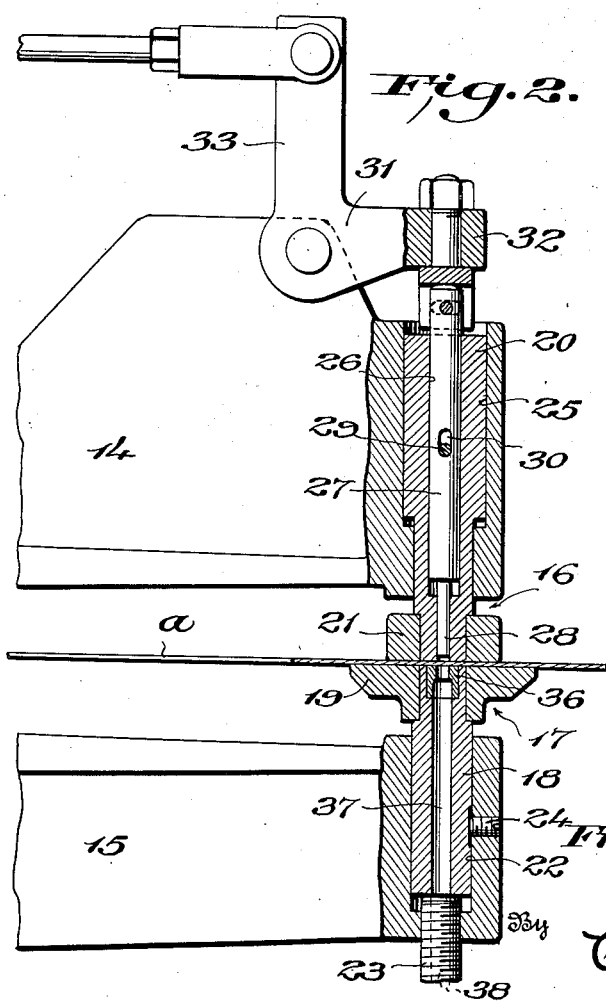
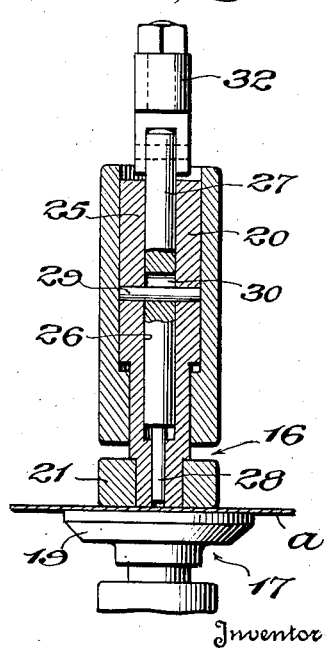
Inventor
Francis B. Ward,
By Carroll Bailey
ATTORNEY Patented Sept. 26, 1950

2,523,978

UNITED STATES PATENT OFFICE 2,523,978

DISK CUTTING MACHINE

Francis Brooke Ward, Cresskill, N. J., assignor to Anemostat Corporation of America, New York, N. Y., a corporation of Delaware Application July 19, 1948, Serial No. 39,463

4 Claims. (Cl. 164—11)

This invention relates to machines for cutting disks from sheet materials, and has particular reference to improvements in disk cutting machines of the type comprising a pair of sheet cutting or shearing wheels and a pair of elements between which a sheet may be held for rotation relative to said wheels so that the latter may operate to cut a disk from the sheet.

After disks have been cut by a machine of the type mentioned it often is necessary to subject the disks to spinning or other operations which require centering of the disks in other machines. Accordingly, the general object of the present invention is to provide simple, practical means whereby a sheet disposed between the sheet holding elements of a machine of the type mentioned may have a hole punched therein at a point coinciding with the center of the disk to be cut from the sheet to enable the subsequently cut disk readily and accurately to be centered in a spinning or other machine for performing a subsequent operation upon the disk.

With the foregoing general object in view, the invention consists in a disk cutting machine including sheet punching means embodying the novel features of construction, combination and arrangement of parts as are illustrated by way of example in the accompanying drawings and as will be hereinafter more fully described and claimed.

In the accompanying drawings, wherein like characters of reference denote corresponding parts in the different views:

Fig. 1 is a side elevation of a disk cutting machine equipped with sheet punching means in accordance with the invention.

Fig. 2 is a vertical section on an enlarged scale through the sheet holding and the sheet punching elements of the machine; and Fig. 3 is a fragmentary vertical section at right angles to Fig. 2.

Referring to the drawings in detail, A designates, generally, a machine of a known type which is designed for cutting disks from sheet materials and which comprises, as usual, a cutting head 10, a bed 11, and a circle arm 12 mounted on said bed 11 for adjustments toward and away from said cutting head 10.

The cutting head 10 is provided with a pair of sheet cutting wheels 13, 13 which may be driven in any suitable manner. On the other hand, the circle arm 12, which is of flattened C-shape as viewed in side elevation and which includes upper and lower arms 14 and 15, respectively, is provided adjacent the free ends of its said arms 14 and 15 with upper and lower sheet holding elements 16 and 17, respectively, between which a sheet $a$ may be held for rotation relative to the cutting wheels 13, 13 so that a disk may be cut therefrom by said cutting wheels. Obviously, by adjusting the circle arm 12 along the bed 11 toward or away from the cutting wheels 13, 13, disks of different diameters may be cut.

The lower sheet holding element 17 comprises a vertically disposed shank 18 carried by the lower arm 15 and provided at its top, above said arm, with a block 19 upon which a sheet $a$ to be cut may rest.

The upper sheet holding element 16 comprises a vertically disposed shank 20 carried by the upper arm 14 in axial alinement with the shank 18 of the lower sheet holding element 17 and provided at its bottom, below said upper arm 14, with a block 21 to engage or to closely overlie a sheet $a$ resting upon the block 19 to retain the sheet upon said block 19.

Preferably the lower sheet holding element 17 is vertically adjustable relative to the lower arm 15 to enable proper vertical positioning relative to the cutting wheels 13, 13 of a sheet $a$ supported by said lower sheet holding element. To this end, the shank 18 may be mounted for vertical sliding movement in a bore 22 in the lower arm 15 and the latter may have threaded therein a screw 23 upon which the shank 18 may rest. Thus, by adjusting said screw the sheet holding element 17 may be adjusted vertically. A set screw 24 may be threaded in the arm 15 for engagement with the shank 18 to secure the element 17 in any desired vertically adjusted position thereof, while the block 19 may be swiveled to said shank 18 to permit free rotation of a sheet $a$ supported upon said block.

The shank 20 of the upper sheet holding element 16 is mounted for vertical sliding movement in a bore 25 in the upper arm 14 whereby said upper sheet holding element may be raised and lowered between sheet-releasing and sheet-holding positions relative to the lower sheet holding element 17. Moreover, said shank 20 has extending therethrough an axial bore 26 in which is disposed a punch rod 27 the lower end portion of which either is formed as, or has suitably attached thereto, a punch 28.

The punch rod 27 and the punch 28 are vertically or longitudinally movable relative to the shank 20, but are limited as to such movement by a suitable lost motion connection between them which may consist, for example, of a pin 29 carried by the shank 20 and extending transversely thereof through a slot 30 of limited length in and extending longitudinally of the punch rod 27. Vertical movement of the shank 20 and, hence, of the upper sheet holding element 16, therefore is under control of the punch rod 27.

Suitable power means is provided for elevating and depressing the punch rod 27 and its punch 28 and may consist, for example, of a bell-crank lever 31 pivoted to the upper arm 14 and having one arm 32 thereof connected to the upper end of the punch rod 27 and the other arm 33 thereof connected to the piston rod 34 of a fluid-operable cylinder and piston power unit 35 mounted upon the arm 14.

The lost motion connection between the shank 20 and the punch rod 27 is such that the pin 29 is disposed at the bottom of the slot 30 when the lower end of the punch 28 is disposed either flush with or above the bottom face of said shank 20. It will be apparent, therefore, that upon operation of the power unit 35 to elevate the punch rod 27 and its punch 28, the shank 20 will not be elevated with said punch rod and punch until the lower end of the punch is fully retracted relative to the lower end of said shank 20. It will likewise be apparent that upon operation of the power unit 35 to depress the punch rod 27 and its punch, the shank 20 may gravitate to its limit of downward movement, as determined either by engagement of its block 21 with a sheet $a$ supported upon the block 19 or by any suitable stop means to predetermine a slight clearance between said block 21 and a sheet $a$ supported upon the block 19, before the punch 28 is projected beyond the lower end of the shank 20.

Assuming that the punch rod 27 and its punch 28 are elevated and are holding the shank 20 and its block 21 elevated, and that a sheet $a$ to be cut has been inserted between the blocks 19 and 21 and is resting upon the block 19, it is apparent that upon operation of the power unit 35 to depress the punch rod 27 and its punch 28, the shank 20 and its block 21 will be permitted to move downwardly with said punch rod and punch until the block 21 assumes a holding position relative to the sheet $a$ either in actual contact therewith or spaced only slightly thereabove as may be desired. Then, upon halting of downward movement of the shank 20 and its block 21 when the latter is in sheet holding position and upon continued depression of the punch rod and its punch, the lower end of the latter will be projected beyond the lower end of the shank 20 to punch a hole in the sheet $a$.

The shank 18 is provided at its top with a female die 36 with which the lower end of the punch 28, when projected beyond the lower end of the shank 20, cooperates to punch a piece of material from the plate $a$ and thus form a hole in said plate. Preferably, the punch is maintained projected to constitute an arbor about which the sheet is rotated until the wheels 13, 13 have cut a disk from said sheet. It will thus be apparent that the punch hole will be located at the exact center of the disk for use in accurately centering the disk in another machine, such as a spinning machine, for performing a subsequent operation thereon.

Extending through the shank 18 and its supporting screw 23 are axial bores 37 and 38, respectively, through which the punchings may gravitate to any suitable point.

When a sheet has been punched and a disk has been cut therefrom, the power unit 35 then is operated to elevate the punch rod 27 and its punch 28 and the shank 20 and its block 21. Due to the lost motion connection between said punch rod 27 and said shank 20, the latter will remain in its lower or sheet holding position until the punch 28 has been fully retracted from the sheet and therefore there will ot occur any distortion of the sheet due to withdrawal of the punch therefrom. When, however, the punch has been fully retracted, the pin 29 will have reached the upper end of the slot 30 so that, continued elevation of the punch rod by the power unit 35 will result in positive elevation of the shank 20 and its block 21. Thereupon, the cut disk may be removed, a new sheet may be inserted between the blocks 19 and 21 and the operation repeated.

From the foregoing description considered in connection with the accompanying drawings it is believed that the construction and operation of the present disk cutting machine will be clearly understood and its advantages appreciated. It is desired to point out, however, that while only a single specific structural embodiment of the invention has been illustrated and described, the same is readily capable of specifically different structural embodiments within its spirit and scope as defined in the appended claims.

I claim:

1. A disk cutting machine including sheet cutting means, upper and lower elements for holding therebetween a sheet to be rotated relative to said cutting means to have the latter cut a disk from the sheet, and a punch mounted in and movable with respect to the upper of the said sheet holding elements for punching a hole in a sheet held between said elements, the lower of said sheet holding elements being rotatable to support the sheet for rotation relative to said sheet cutting means and having therein an axial hole alined with said punch to permit the latter to pass entirely through the sheet both to punch a hole of uniform diameter therethrough and to serve as an arbor for holding the sheet against shifting in its plane during its rotation relative to said cutting means.

2. A disk cutting machine including sheet cutting means, upper and lower arms, a member rotatably mounted upon said lower arm for supporting a sheet for rotation relative to said cutting means to have the latter cut a disk from the sheet, an element mounted upon said upper arm for holding a sheet upon said sheet supporting member, said element being vertically movable between operative and inoperative positions relative to a sheet supported upon said sheet supporting member, and a punch mounted in and movable longitudinally relative to said element for punching a hole in a sheet resting upon said rotatable member at a point coinciding with the center of rotation of said member and the sheet, said sheet supporting member having therein an axial hole alined with said punch to permit the latter to pass entirely through the sheet both to punch a hole of uniform diameter entirely therethrough and to serve as an arbor for holding the sheet against shifting in its plane during its rotation relative to said cutting means.

3. A disk cutting machine including sheet cutting means, upper and lower arms, a member rotatably mounted upon said lower arm for supporting a sheet for rotation relative to said cutting means to have the latter cut a disk from the sheet, an element mounted upon said upper arm for holding a sheet upon said sheet supporting member, said element being vertically movable between operative and inoperative positions relative to a sheet supported upon said sheet supporting member, said element having an axial bore, a punch in said bore movable longitudinally relative to said element for punching a hole in a sheet supported upon said sheet supporting means for elevating and depressing said punch, and a lost motion connection between said punch and said element whereby said punch is effective to penetrate and to be withdrawn from the sheet only while the sheet is held upon said sheet supporting member by said element, said sheet supporting member having therein an axial hole alined with said punch to permit the latter to pass entirely through the sheet both to punch a hole of uniform diameter entirely therethrough and to serve as an arbor for holding the sheet against shifting in its plane during its rotation relative to said cutting means.

4. A disk cutting machine including sheet cutting means, upper and lower arms, a sheet supporting member rotatably mounted upon said lower arm, a sheet holding element mounted upon said upper arm for movement between raised and lowered inoperative and operative positions, respectively, relative to a sheet resting upon said sheet supporting member, a punch carried by said upper arm for elevation and depression relative to said sheet supporting member and effective when depressed to cooperate with said sheet supporting member to punch a hole in a sheet resting upon the latter, means for elevating and depressing said punch, and a lost motion connection between said punch and said sheet holding element whereby the latter is elevated with said punch following a predetermined amount of elevation of the latter and whereby said punch may be projected through and withdrawn from a sheet resting upon said sheet supporting member only when said sheet holding element is in its lowered sheet holding position, said sheet supporting member having therein an axial hole alined with said punch to permit the latter to pass entirely through the sheet both to punch a hole of uniform diameter entirely therethrough and to serve as an arbor for holding the sheet against shifting in its plane during its rotation relative to said cutting means.

FRANCIS BROOKE WARD.

REFERENCES CITED

The following references are of record in the file of this patent:

UNITED STATES PATENTS

| Number | Name | Date |
|---|---|---|
| 842,603 | Zidovec | Jan. 29, 1907 |

FOREIGN PATENTS

| Number | Country | Date |
|---|---|---|
| 11,088 | Bostwick et al. | May 8, 1911 |